Dec. 30, 1930. R. W. LOHMAN 1,786,626
METHOD AND APPARATUS FOR FEEDING GASES OR VAPORS
Filed Nov. 1, 1926 2 Sheets-Sheet 1
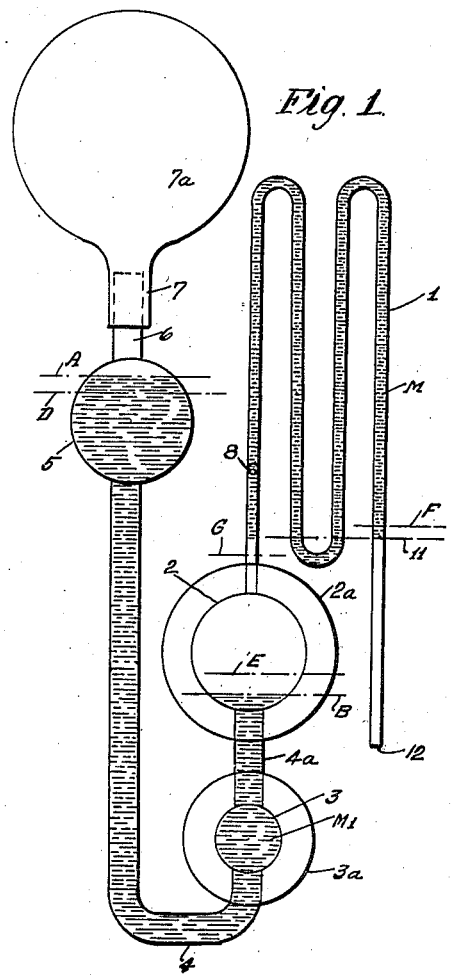
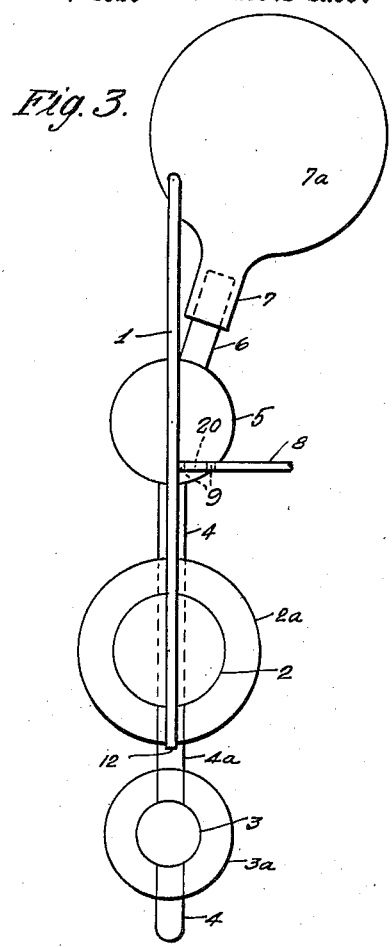
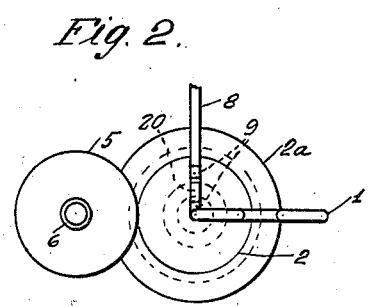
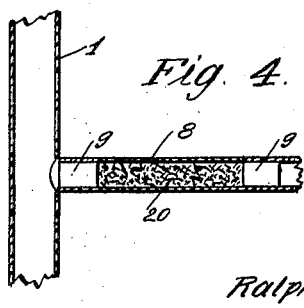
Inventor
Ralph W. Lohman.
Attorney.

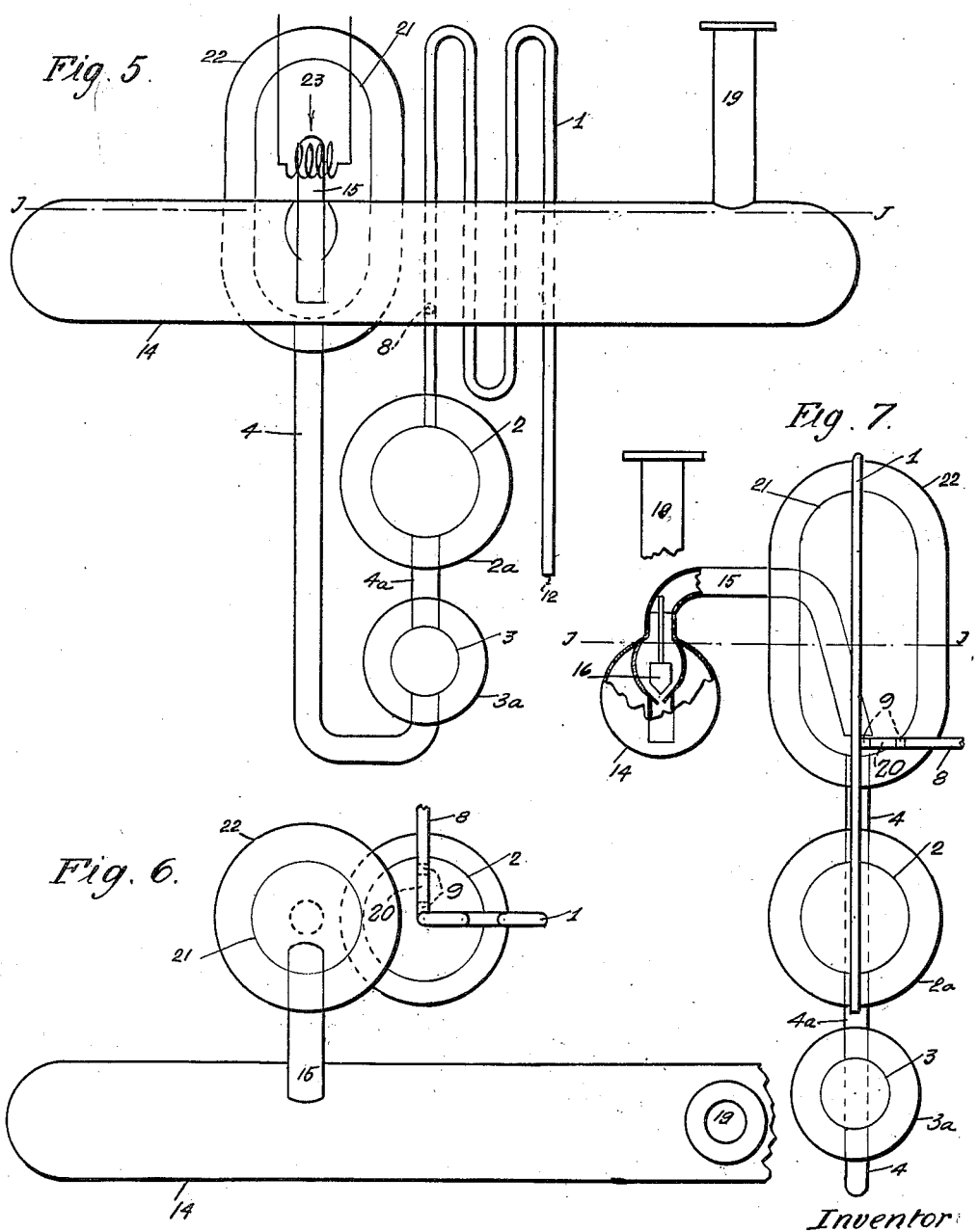

Patented Dec. 30, 1930

1,786,626

UNITED STATES PATENT OFFICE

RALPH W. LOHMAN, OF LOS ANGELES, CALIFORNIA

METHOD AND APPARATUS FOR FEEDING GASES OR VAPORS

Application filed November 1, 1926. Serial No. 145,670.

This invention relates to a method and apparatus for feeding gases or vapors or other gaseous substances to any container or out of any container; or the method may be looked upon as one for transferring or feeding such gaseous substance from one container to another.

The invention has been made and developed particularly with a view to providing a suitable gas feeding means for illuminating tubes which contain gaseous substances at comparatively low pressures; but the invention will be seen to be equally as well applicable to the feeding of gaseous substances to any tubes such as X-ray tubes or soft radio amplifying tubes, etc., or for feeding gaseous substances in fact to or from any container. Consequently, I do not wish the invention to be limited to the feeding of gaseous substances to electrically operated tubes containing such substances at low pressures; but as feeding of such gaseous substances to such tubes to maintain therein a substantially constant pressure has in the past entailed major difficulties, I proceed to a detailed explanation of my invention particularly with reference to supplying such tubes with gas and more particularly to supplying illuminating tubes with gas.

Although various methods of feeding gas, for instance neon, to an illuminating tube have been proposed, such methods have usually been defective in that they have involved the use of apparatus containing valves or ground joints or other mechanically movable pieces, all of which are subject to more or less leakage, which, although small over a short period of time, is usually sufficient over longer periods to allow contamination of the gas contained within the tube or to cause uncontrollable changes of pressure within the tube. It is, of course, well understood how neon illuminating tubes, for instance, in order to maintain their maximum operating efficiency, must be kept filled at all times with neon gas in as pure a state as possible and at pressures within a comparatively narrow pressure range. The operation of such tubes causes the gradual disappearance of the gas into the tube walls and electrodes and elsewhere, so that unless the gas is replenished from time to time, the tube, sooner or later becomes inoperative at any reasonable voltage.

The object of this invention is the provision of method and apparatus for transferring gaseous substances without the necessity of using mechanically movable parts such as valves, ground joints, etc., which are subject to leakage, and to provide for the transfer of a purified gas or other gaseous substance without any danger of contamination. In the accompanying drawing I show specific and illustrative forms of apparatus for carrying out my method, and the following specification deals in detail with specific and illustrative forms of apparatus and typical methods intended to indicate the invention by illustration of concrete forms which it may take. The illustration of these specific concrete forms of the invention will not, however, be taken as a limitation upon the invention, except insofar as the appended claims are specifically so limited.

In the following description I set forth two specifically different methods and specifically different apparatus. In one of them I describe the gas transferring apparatus as initially actuated by mechanically applied pressure; in the other I use pressure generated by heat expansion of a gas or vapor. In the accompanying drawings:

Fig. 1 is a front elevation of apparatus for the first mentioned specific method;

Fig. 2 is a plan of said apparatus;

Fig. 3 is a side elevation of the same;

Fig. 4 is an enlarged sectional detail of the parts 8 and 9 shown in Figs. 1, 2 and 3;

Fig. 5 is a front elevation of apparatus for the second mentioned specific method;

Fig. 6 is a plan of the same; and

Fig. 7 is a side elevation of the same.

Describing first the apparatus and referring first to Figs. 1 to 4, inclusive, I show there an inverted double U-tube 1 terminating at one end (the right hand end in Fig. 1) in a closure at 12 and connecting at its left hand end with a vessel 2, which may be of any suitable shape. As the apparatus herein described may in practice be made of glass, the vessel 2 is shown as a spherical glass bulb; and the double U-tube 1 may be a capillary or larger tube of glass. While I show tube 1 as a double U-tube, and while it is preferably in such form, it will be understood from the description of operation following that any form of tube in which balancing columns of a suitable liquid may be maintained, or a single column of the requisite barometric height, will suffice for the purposes of this invention. Preferably the liquid contained within tube 1 may be mercury, but as will hereinafter appear, any other suitable liquid may be used.

Vessel 2 contains the gas or vapor which is desired to be fed out through tube 8, which is sealed into the left hand leg of tube 1 at a point somewhat above the normal level of the liquid in tube 1. The appurtenances of the outlet tube 8 will be more fully described later; but it will suffice at present to say that tube 8 is connected with the container, for instance, the neon tube, into which it is desired to introduce the neon (the gaseous substance) contained in vessel 2. It will be understood that the double U-tube 1 contains a filling of the selected liquid (mercury for instance) filling it completely between points at level 11 in its two outer legs; and that the end space between the closed end 12 and the mercury column in the right hand leg contains any suitable gas (air for instance) which gas is always at substantially the same pressure as that of the gas in vessel 2. The mercury or other liquid in tube 1 is indicated at M.

If the device is to be used under conditions where the external temperature changes are marked, vessel 2 may be surrounded by any suitable heat insulator, for instance, an exhausted space between the wall of vessel 2 and a surrounding bulb 2a. Leading out from the bottom of vessel 2 is a tube 4a which contains a bulb 3 within it, this bulb 3 being of suitable capacity to provide storage space for the increase in volume of gas in bulb 2 should such gas, notwithstanding its thermal insulation, increase too much in volume. This storage space in bulb 3 becomes available through the displacement of the mercury $M^1$ which is normally contained in bulb 3 and in tube 4a and bulb 2 up to such a level as indicated B. Bulb 3 may also be thermally insulated with a surrounding jacket bulb 3a if desired.

A tube 4 leads out of the bottom of bulb 3 and turning upward ends in bulb 5. Tube 4 and tube 4a, with the bulb 3, thus form a U-tube connecting the bulb 5 with bulb 2. Bulb 5 is located at a suitable elevation above bulb 2 and mercury or other liquid $M^1$ will normally stand between the level indicated A in bulb 5 to such a level as indicated B in bulb 2. Above the mercury level in bulb 5 there is a connecting tube 6 to which tube 7 of a hand pressure bulb 7a may be connected.

The hand pressure bulb 7a may be, for instance, an ordinary rubber bulb, and it typifies any suitable mechanical means of placing increased pressure upon the surface of the mercury or other liquid in bulb 5. Final outlet tube 8 contains a plug of such a character or of such a material as will pass the gas normally contained in bulb 2, but will not pass to any appreciable degree the liquid contained in double U-tube 1. For instance, tube 8 may have in it two spaced plugs 9. If mercury is the liquid used in tube 1, then such a substance as unglazed porcelain of suitable composition and fired to a suitable temperature will answer well for plugs 9, unglazed porcelain being substantially impermeable to mercury but permeable to gases. Between the two plugs 9 the filling 20 is placed, of a material suitable for trapping minute particles of mercury, mercury vapor, water vapor, etc.; and suitable substances for this purpose may be for example gold or zinc foil, or phosphorous pentoxide, or a mixture of them.

The end of plug 9, which is normally in contact with the mercury in tube 1, should be of such shape and so placed that the mercury or other sealing liquid cannot pocket in it or lie upon it or form a film over its end so as to seal its end when the mercury column as a whole has risen above that plug. If the mercury exposed end of the plug be made flat or slightly round and does not project into tube 1, it will be suitable.

Assuming that the apparatus contains a charge of gas in bulb 2 and is filled with mercury as described, and the system is in pressure equilibrium with the mercury levels as indicated; the gas in bulb 2 will then be under atmospheric pressure plus the pressure equivalent to the mercury column from the level B to the level A. For purposes of illustration I will suppose the vertical distance between levels A and B is 60 mm.; therefore the pressure on the gas in vessel 2 will normally be 820 mm. As the mercury in the two outside arms of the double U-tube has been adjusted to the same level 11 by construction, the gas pressure in the space at the closed right hand end of tube 1 will be equal to that in bulb 2.

Assuming now that additional air pressure is applied to the surface A or mercury in bulb 5. This surface will be depressed and the mercury surface B in bulb 2 elevated, compressing the gas in bulb 2, and this additional gas pressure in bulb 2 will raise the mercury column in the left hand leg of tube 1. When sufficient pressure has been applied at surface A, the column of mercury in the left hand leg of tube 1 is raised high enough to uncover the porous plug 9, and gas will then pass through the plugs 9 and out through tube 8. This condition may be maintained as long as may be desired so that any desired quantity of gas may be fed out through tube 8. During this condition of affairs the gas in the lower right hand end of tube 1 is compressed, the mercury being forced down in that leg of the tube. Conversely, when the pressure on surface A and bulb 5 is relieved, the gas in the lower right hand end of tube 1 will expand and force the mercury column back towards its normal position, covering the porous plug and preventing further feed of gas through tube 8.

During the foregoing described operation some of the gas will have escaped from bulb 2, reducing the pressure upon the remaining body of gas, and equilibrium will then be restored by a readjustment of the mercury levels. For instance, level A will then be at a lower level such as indicated D, level B will move up to that indicated at E, the mercury level which was formerly at level 11 in the left hand leg of U tube 1 will descend to such a level as indicated at G, and that in the right hand leg of tube 1 will rise to such a level as indicated at F. Then the finally readjusted pressure upon the gas in bulb 2 will be atmospheric pressure plus the pressure equivalent to the mercury column between levels D and E, say 40 mm., or a total of 800 mm., of mercury.

However, this change in pressure upon the gas in bulb 2 in no way affects the operation of the system, and subsequent temporary increases of pressure on the surface of the mercury in bulb 5 will operate as before to raise the mercury in the left hand leg of tube 1 past the porous pulg 9 and allow escape of gas. On each successive operation to feed gas out through tube 8 the mercury in bulb 2 will rise to a higher level and that in the left hand leg of tube 1 will fall to a lower level, until by successive gas feeding operations all the gas in bulb 2 has been exhausted and the mercury levels initially at B and 11 have united.

It may be well, however, to point out that a very small bulb 2 filled with gas at approximately atmospheric pressure will supply many times sufficient gas to fill a very large illuminating tube at its normally low operating pressure, so that very many operations of feeding gas out of bulb 2 will be required to exhaust that bulb of its gas. For instance, if bulb 2 is say 22 mm., in diameter, it will contain sufficient gas (initially at atmospheric pressure) to recharge over 800 times a 7 mm. vacuum tube 100 ft. long, raising its pressure each time from 3 mm. to 4 mm. of mercury.

Referring now more particularly to the construction of apparatus shown in Figs. 5 to 7, inclusive, it will be noted that the double U-tube with its connected gas bulb 2, storage bulb 3, and the connecting tubes 4 and 4a are constructed in the same manner as before, the tube 1 having outlet tube 8 in the same position and supplied with the same porous plugs. In fact, the structure and operation of the apparatus shown in these figures is the same as that of the apparatus shown in Figs. 1 to 4, inclusive, except as to the method of generating pressure upon the surface of the mercury in the bulb or other vessel at the upper end of tube 4. In place of the bulb 5, formerly described, I show for instance a cylindric chamber 21 which may be thermally insulated with the jacket 22 either of non-conducting material or constituting an exhausted envelope. Chamber 21 has in its upper part an electric heating coil 23 which typifies any suitable heating means, and which is shown preferably placed in the upper interior of vessel 21. It will be unnecessary to name various other heating elements which may be used in place of coil 23 as such elements will occur to those skilled in the art.

The upper portion of chamber 21 is filled with gas or vapor or liquid which preferably, although not necessarily, has a large coefficient of cubical expansion and a low specific heat.

A vessel 14 of comparatively large cubic content compared with that of chamber 21 is provided and is of such shape and position relative to chamber 21 that when connected to chamber 21 by means of tube 15 the level of mercury in vessel 14 will descend only very slightly in replenishing chamber 21 and bringing its mercury level back up approximately to the level indicated J—J in Figs. 5 and 7. Tube 15 is shown as being in the form of a siphon, but it need not be so; it is only necessary that it connect into both chambers 14 and 21 at points below the mercury levels therein. To allow mercury to feed from chamber 14 to chamber 21 and not feed back from chamber 21 a suitable check valve 16 may be placed in tube 15. This check valve is indicative of any suitable means of preventing back flow of mercury from 21 to 14, but other means may be used. For instance, tube 15 may be made with so small an inner bore that, during the comparatively short periods in which additional pressure is applied to the surface of mercury in chamber 21 only a very small amount of mercury will be forced back into chamber 14; while during the comparatively much longer periods of inactivity of the apparatus, the mercury will flow through the small tube 15 from chamber 14 to chamber 21 to bring the mercury level in 21 back to approximately level J. From what I have said about the very small amount of gas fed out of bulb 2 on each operation, and the consequent very small change in the mercury levels throughout the device, it will be readily understood that a tube 15 of approximately capillary size will suffice well to perform the office of a check and at the same time feed mercury into chamber 21.

Chamber 14 may be replenished from time to time with mercury, as through the filling neck 19.

While the foregoing description sets forth an internally heated expansion chamber 21, the invention even in the specific form now being described is not limited to such an arrangement, but contemplates the heat expansion of the fluid in the upper part of chamber 21 in any suitable manner. For instance, heat may be applied externally to the chamber, in which case the insulating jacket 22 or its upper part will be omitted.

Further, the invention contemplates the possibility of heating the upper part of the mercury column in chamber 21, either with or without the provision of another body of heat expansible fluid above the mercury. In any case, the upper part of the mercury column will be heated to some extent, with some resulting expansion; and such expansion may be used even exclusively for depressing the mercury column, although the expansion of mercury is small as compared with that of a gas or vapor.

Assuming that chambers 21 and 14 are filled to the level J—J with mercury, heat is then applied to the expansible contents of chamber 21 by any of the means set forth, the fluid in the upper part of the chamber, preferably of high coefficient of expansion, will increase in volume and tend to displace the mercury surface J in chamber 21 downwardly. This displacement of the mercury surface will have exactly the same action as regards the remainder of the apparatus as hereinbefore described in connection with Figs. 1 to 4 inclusive. The increased pressure cannot force the mercury back into chamber 14, at least in any appreciable quantity, due to the structures before described. Gas from bulb 2 will continue to be discharged through outlet tube 8 until such time as the heat is cut off from chamber 21 and the mercury therein returns toward its initial level. However, the mercury level in chamber 21 will not at the end of each operation rise to its previous level, but would remain permanently and progressively lower unless replenished from chamber 14. But as soon as the excess pressure is removed from the surface of the mercury in chamber 21 mercury flows from chamber 14 to raise the mercury level in 21 nearly to its original normal point. Thus the gas in chamber 21 will be, after each operation, restored nearly to its initial pressure and volume and therefore very nearly to its original heat conductivity and specific heat, so that equal periods of heat application at equal rates will produce approximately uniform displacement of the mercury levels and consequently nearly equal quantities of gas discharge through the final outlet tube 8.

While under many conditions of operation it would not necessarily be required that equal quantities of applied heat should discharge equal amounts of gas, the above described arrangement of parts is desirable in that it enables one to know beforehand just about how much gas will be fed out through tube 8 if heat is applied for a given period of time. Gas can, however, be discharged through the final outlet of this type of apparatus without the level restoring features of the supply chamber 14 and its connection with chamber 21; it merely then being the case that, as the level of mercury falls lower and lower in chamber 21 a longer application of heat at a given rate is necessary to obtain a given displacement of the mercury levels and to finally discharge a given amount of gas.

I claim:

1. Apparatus for feeding of a gas or vapor comprising a tube having a plurality of vertical legs, a column of liquid balanced in said tube in its legs, a discharge tube connecting with one leg of the first mentioned tube at a point normally covered by the liquid column, said discharge tube having therein a plug of a material impermeable to liquid but permeable to gas, and said discharge tube being located at a point near the end of the liquid column in said mentioned leg, a gas containing vessel communicating with the end of said mentioned leg and adapted to hold a charge of gas which comes into contact with the end of the liquid column in said leg, and means for applying varying pressures to said gas in said vessel to move said liquid column in said leg to a point where said discharge tube is uncovered, said means for applying varying pressure to the gas in said vessel, comprising a U-tube connecting with said vessel, a column of liquid standing in said U-tube, and means for applying varying pressures to the end of said column of liquid.

2. Apparatus for feeding of a gas or vapor comprising a tube having a plurality of vertical legs, a column of liquid balanced in said tube in its legs, a discharge tube connecting with one leg of the first mentioned tube at a point normally covered by the liquid column, said discharge tube having therein a plug of a material impermeable to liquid but permeable to gas, and said discharge tube being located at a point near the end of the liquid column in said mentioned leg, a gas containing vessel communicating with the end of said mentioned leg and adapted to hold a charge of gas which comes into contact with the end of the liquid column in said leg, and means for applying varying pressures to said gas in said vessel to move said liquid column in said leg to a point where said discharge tube is uncovered, said means for applying varying pressure to the gas in said vessel comprising a U-tube connecting with said vessel, a column of liquid standing in said U-tube, and means for applying varying pressures to the end of said column of liquid, and an enlarged expansion chamber in said U-tube.

3. Apparatus for feeding a gas or vapor, comprising a tube having a plurality of vertical legs, a column of liquid balanced in said tube in its legs, a discharge tube connecting with one leg of the first mentioned tube at a point normally covered by the liquid column, said discharge tube having therein a plug of a material impermeable to liquid but permeable to gas, and said discharge tube being located at a point near the end of the liquid column in said mentioned leg, a gas containing vessel communicating with the end of said mentioned leg and adapted to hold a charge of gas which comes into contact with the end of the liquid column in said leg, and means for applying varying pressures to said gas in said vessel to move said liquid column in said leg to a point where said discharge tube is uncovered, said means for applying varying pressure to the gas in said vessel comprising a U tube connecting with said vessel a column of liquid standing in said U tube, and means for applying varying pressures to the end of said column of liquid, and an enlarged expansion chamber in said U tube, the other end of said first mentioned tube being closed and containing a compressible gas or vapor between its closed end and the adjacent end of the liquid column therein.

4. Apparatus for feeding a gas or vapor, comprising a tube having a plurality of vertical legs, a column of liquid balanced in said tube in its legs, a discharge tube connecting with one leg of the first mentioned tube at a point normally covered by the liquid column, said discharge tube having therein a plug of a materially impermeable to liquid but permeable to gas, and said discharge tube being located at a point near the end of the liquid column in said mentioned leg, a gas containing vessel communicating with the end of said mentioned leg and adapted to hold a charge of gas which comes into contact with the end of the liquid column in said leg, and means for applying varying pressures to said gas in said vessel to move said liquid column in said leg to a point where said discharge tube is uncovered, said means for applying varying pressure to the gas in said vessel, comprising a U tube connecting with said vessel, a column of liquid standing in said U tube, and means for applying varying pressure to the end of the liquid column in said U tube comprising a vessel connected with the end of said U tube and adapted to contain a heat expansible gas or vapor above the end of the liquid column, and means for heating said heat expansible gas or vapor.

5. Apparatus for feeding a gas or vapor, comprising a tube having a plurality of vertical legs, a column of liquid balanced in said tube in its legs, a discharge tube connecting with one leg of the first mentioned tube at a point normally covered by the liquid column, said discharge tube having therein a plug of a material impermeable to liquid but permeable to gas, and said discharge tube being located at a point near the end of the liquid column in said mentioned leg, a gas containing vessel communicating with the end of said mentioned leg and adapted to hold a charge of gas which comes into contact with the end of the liquid column in said leg, and means for applying varying pressures to said gas in said vessel to move said liquid column in said leg to a point where said discharge tube is uncovered, said means for applying varying pressure to the gas in said vessel, comprising a U tube connecting with said vessel, a column of liquid standing in said U tube, means for applying varying pressure to the end of the liquid column in said U tube, comprising a vessel connected with the end of said U tube and adapted to contain a heat expansible gas or vapor above the end of the liquid column, means for heating said heat expansible gas or vapor, and means for replenishing and maintaining substantially constant the level of the upper end of the liquid column in said U tube, comprising a liquid storage vessel having a liquid passage connection into said chamber, said liquid passage connection being provided with means for preventing any substantial flow of liquid back from said chamber to said storage vessel.

6. Apparatus for feeding a gas or vapor, comprising a tubular structure embodying two liquid containing tubes, two liquid columns one in each of said tubes spaced end to end, an enclosure surrounding the space between the two said columns and communicating with each, said space being adapted to contain the gaseous substance which is to be fed, a gas permeable outlet connecting with one of said tubes at a point normally covered by one of the liquid columns, means to displace one of said liquid columns longitudinally along its tube, said last mentioned means comprising a chamber communicating with said tube and adapted to contain a heat expansible fluid, and means for heating said fluid.

7. Apparatus for feeding a gas or vapor, comprising a tubular structure embodying two liquid containing tubes, two spaced liquid columns, one in each of said tubes, the space between the two said columns being adapted to contain the gaseous substance which is to be fed, a gas permeable outlet connecting with one of said tubes at a point normally covered by one of the liquid columns, means to displace one of said liquid columns longitudinally along its tube, said last mentioned means comprising a chamber connected with said tube and adapted to contain a compressible gas, means for varying the pressure on said gas, and means for maintaining substantially constant the liquid level of the column in said last menioned tube comprising a supply chamber containing a supply of said liquid, and a connection between the supply chamber and the tube allowing passage of liquid from the supply chamber to the tube and substantially obstructing passage in the opposite direction.

8. Apparatus for feeding a gas or vapor, comprising a chamber, a tube connected with the bottom thereof containing a column of gas displaceable liquid, means to apply pressure to said column to raise the level of liquid in the chamber and displace the gas body upwardly, a tube leading from the upper end of the chamber and containing an upwardly displaceable column of liquid, and a lateral gas outlet leading from said last mentioned tube at a point above the normal position of the lower end of the liquid in said tube.

9. Apparatus for feeding a gas or vapor, comprising a chamber, a tube connected with the bottom thereof containing a column of gas displaceable liquid, means to apply pressure to said column to raise the level of liquid in the chamber and displace the gas body upwardly, a tube leading from the upper end of the chamber and containing an upwardly displaceable column of liquid, and a lateral gas outlet leading from said last mentioned tube at a point above the normal position of the lower end of the liquid in said tube, said gas outlet having therein a plug of a material impermeable to liquid but permeable to gas.

In witness that I claim the foregoing I have hereunto subscribed my name this ninth day of October, 1926.

RALPH W. LOHMAN.